(12) United States Patent
Tolinski

(10) Patent No.: US 6,390,543 B1
(45) Date of Patent: May 21, 2002

(54) SAW TOOTH SUNROOF SEAL

(75) Inventor: Roch J. Tolinski, Howell, MI (US)

(73) Assignee: Meritor Light Vehicle Technology, LLC, Troy, MI (US)

( * ) Notice: Subject to any disclaimer, the term of this patent is extended or adjusted under 35 U.S.C. 154(b) by 0 days.

(21) Appl. No.: 09/652,829

(22) Filed: Aug. 31, 2000

(51) Int. Cl.[7] ............................. B60J 7/22; B60J 10/12
(52) U.S. Cl. ................................. 296/217; 296/216.09
(58) Field of Search ......................... 290/216.09, 217, 290/213

(56) References Cited

U.S. PATENT DOCUMENTS 4,375,899 A * 3/1983 Kajiyama et al. ... 296/216.09 X
4,891,913 A * 1/1990 Shimura et al. .... 296/216.09 X
5,234,250 A * 8/1993 Hattass et al. ......... 296/216.09

FOREIGN PATENT DOCUMENTS

DE 0458083 B1 7/1994
GB 2191234 * 12/1987 ............ 296/216.09

* cited by examiner

Primary Examiner—Dennis H. Pedder
(74) Attorney, Agent, or Firm—Carlson, Gaskey & Olds

(57) ABSTRACT

A sunroof seal has a window, and a seal mounted thereon. The seal has an upper portion having a channel for engaging the window along its corresponding surface. The seal also includes a lower portion having a non-uniform cross section formed thereon for reducing the windnoise from a sunroof that is in the vented position.

12 Claims, 1 Drawing Sheet

SAW TOOTH SUNROOF SEAL

BACKGROUND OF THE INVENTION

The present invention relates to a sunroof seal having a cross-sectional design to reduce windnoise when the sunroof is in the vented position.

Sunroofs are commonly designed to allow the window to be opened by sliding the window in a lateral direction to expose an opening formed in the roof structure or by tilting the window into a vent position by angling the window in a horizontal direction with the front face of the window as the pivot point. For purposes of this application, the term sunroof is meant to include Moonroofs or other closures that can be moved to a vent position in a vehicle roof.

When the sunroof window is in the vented position, excessive windnoise, including a whistling sound may occur as the car is moving. The air flowing over the vented sunroof causes an increase in windnoise.

Devices to address wind noise have been proposed. In one such device, a cover includes a planar attachment at a rear edge that extends downward when the cover is extended. The planar attachment has several protrusions formed at a free end. A seal or gasket is located at the rear edge of the cover, and the protrusions are molded as a single piece to the gasket. The protusions are intended to address the windnoise problems.

The above approach is deficient in several regards. First, it only addresses a portion of the windnoise problem. Further, the proposed device is more intended to block air flow, rather than change air flow characteristics. It is not practical to block all air flow in a sunroof at a vertical position.

Therefore, it is an object of the present invention to provide a sunroof window seal that is attached to a window at all of its sides and including a portion extending downward with a non-uniform cross section to prevent windnoise when the window is moved to its vented position.

SUMMARY OF THE INVENTION

In a disclosed embodiment, a window for a sunroof has a seal with an upper portion mating with a corresponding surface of the window. The seal also includes a lower portion extending downward from the window. The lower portion has a non-uniform cross section for reducing windnoise when the window is in a vented position. More preferably, the non-uniform cross section has regularly occurring smaller and larger portions. More particularly, the cross section is a sawtooth shape.

The seal extends along the sides of the window, and breaks up wind flow that might otherwise cause a whistling noise.

DETAILED DESCRIPTION OF THE PREFERRED EMBODIMENT

Figure 1:
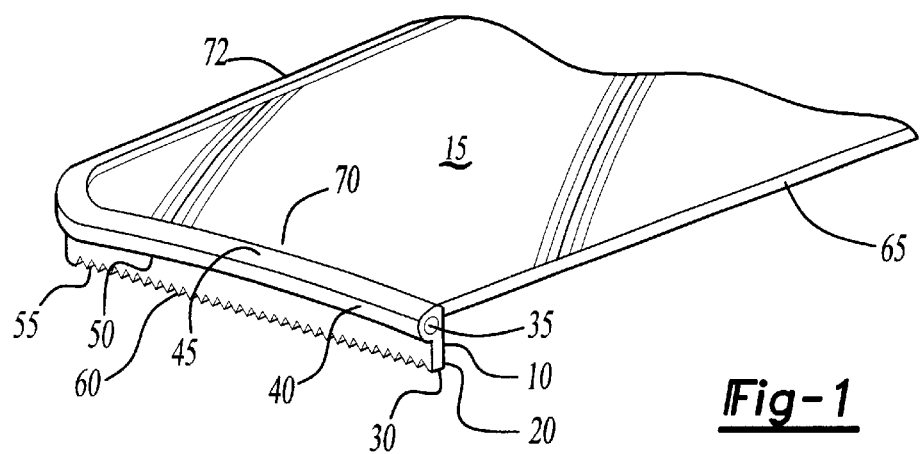
FIG. 1 is a perspective view of the sunroof window and saw seal.

With reference to FIG. 1, there is generally shown at 10 a seal partially surrounding a sunroof window 15. The seal 10 is formed of an elastomeric material such as, rubber, silicone or the like. The seal material should resist exposure to the weather, and maintain its elasticity and shape under both cold and hot environments. An ultra-violet or UV stabilizer may also be included in the elastomeric material to protect the seal from deterioration due to exposure to sunlight. The seal will generally be manufactured using an extrusion process, forming the appropriate cross-sectional shape of the seal. A cutting process may then be utilized to form an appropriate non-uniform cross section as disclosed below.

The seal 10 has a generally P-shaped cross section 20 with an upper window engaging portion 25 and lower portion 30. The upper window engaging portion 25 has a channel 35 for engaging the window 15 and a vehicle frame around its periphery. The channel 35 has an upper surface 40, side surface 45, and lower surface 50 for engaging the window 15 along its corresponding surfaces.

The lower portion 30 extends downward from the lower surface 50 of the channel 35. There is a non-uniform cross section 55 formed on the lower edge 60 of the lower portion 30. In the illustrated, preferred embodiment, the non-uniform cross section is a saw tooth design consisting of a series of adjacent triangles formed on the lower edge 60 of the lower portion 3 though the depicted, preferred embodiment has a non-uniform cross section of a saw tooth design, it is to be understood that other configurations may be utilized by the present invention. For example, a notched design or similar configuration may be utilized, as long as the design disrupts the uniform shape of the lower portion 30 of the seal 10.

Figure 2:
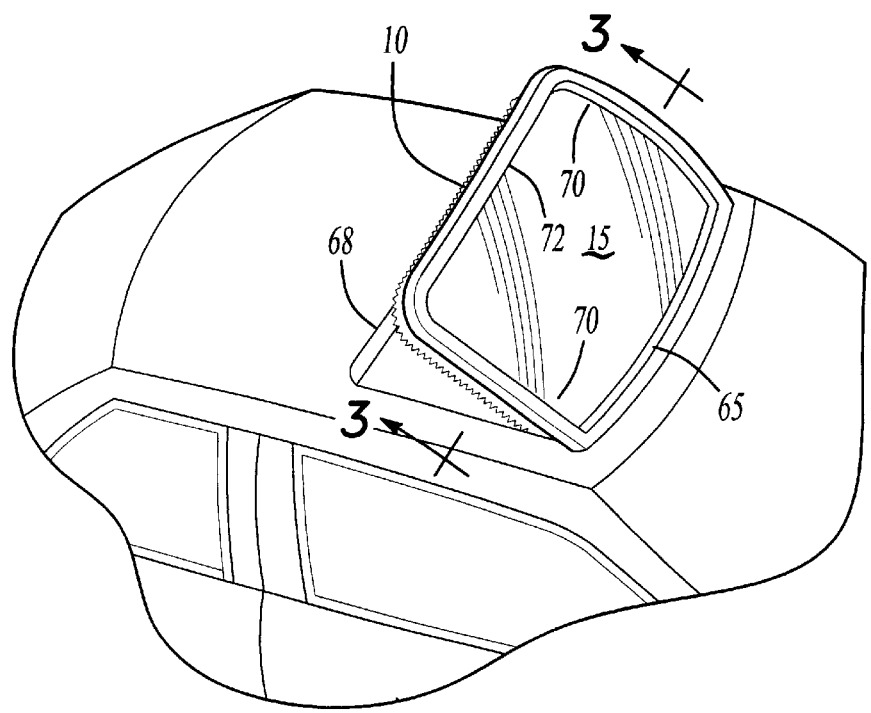
FIG. 2 is a perspective view showing the roof, seal, and the window in the vented position.
Figure 3:
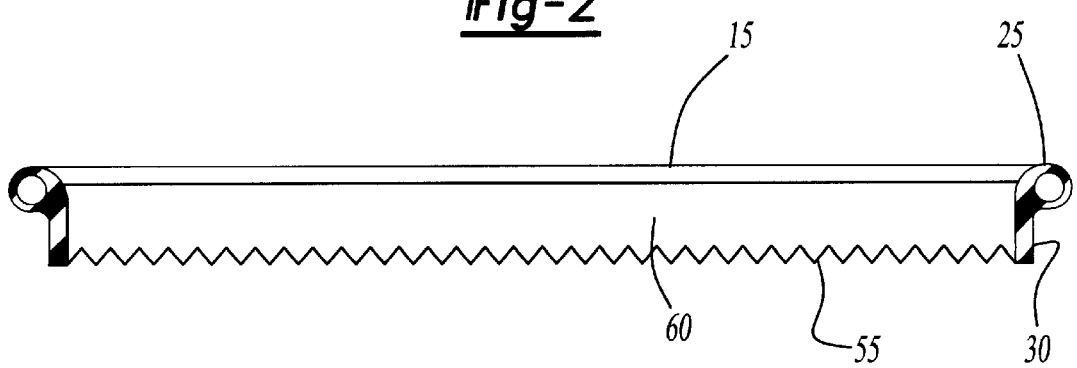
FIG. 3 is a view of the sunroof window and seal along the 3—3 direction.

The seal 10 surrounds the periphery of the window 15 on all sides except the front 65 of the window 15. Notably, a seal can extend along the front 65, but the non-uniform cross section need not be at the front. The saw tooth design 55 of the seal 10 disrupts the air flow when the window 15 is in the vented position, as shown in FIG. 2, reducing windnoise, and eliminating the common whistling sound that occurs when driving with a sunroof in its vented position. As will be appreciated, the apparatus for moving the window to its vented position is known. The lowermost portion of lower portion 30 is spaced from vehicle roof 68 in this vented position. Thus, air flows between the window 15 and roof 68 at both the rear and the sides.

To this end, the non-uniform cross section extends along the sides 70 of the window and along the rear 72. It is through these areas that air flows creating the wind noise. The non-uniform cross section does not block this flow, but instead breaks the flow. While the non-uniform cross section preferably extends along the entire rear and sides, it may also only be disposed over the majority of the rear or sides, or perhaps only at selected portions.

While a preferred embodiment is disclosed, a worker in this art would understand that various modifications would come within the scope of the invention. Thus, the following claims should be studied to determine the true scope and content of this invention.

What is claimed is:

1. A sunroof comprising:
   a window having a front, rear and first and second sides;
   a seal having an upper portion surrounding the window on the rear, first and second sides and lower portion;
   said lower portion having a non-uniform cross section formed thereon for reducing windnoise for at least portions of said rear, first and second sides;
   said sunroof being movable to a vented position with said rear and sides positioned above said front.

2. The sunroof of claim 1, wherein the non-uniform cross section comprises a series of regular enlarged portions.

3. The sunroof of claim 2, wherein the series of regular enlarged poritons comprises a saw tooth design.

4. The sunroof of claim 1, wherein the window seal has a generally P-shaped cross section.

5. The sunroof of claim 1, wherein said non-uniform cross section extends along the majority of said rear and said first and second sides.

6. The sunroof of claim 5, wherein said non-uniform cross section extends along the entirety of said rear and said first and second sides.

7. A sunroof assembly comprising:

a window having a front edge, a rear edge, and first and second sides extending between said front and rear edges;

a seal installed around said rear edge and said first and second sides;

said seal including an upper portion surrounding said rear edge and said first and second sides and including a lower portion defined by a non-uniform cross section;

said window being movable to a vented position with said rear edge and said first and second sides being positioned above said front edge and wherein said non-uniform cross section reduces wind noise generated along said rear edge and said first and second sides when said window is in said vented position.

8. The assembly of claim 7, wherein said non-uniform cross-section is defined by a saw tooth profile.

9. The assembly of claim 7, wherein said upper portion comprises a single channel having an upper surface, a side surface, and a lower surface for engaging said window along said rear edge and said first and second sides.

10. The assembly of claim 7, wherein said seal forms a C-shaped member leaving said front edge uncovered.

11. The assembly of claim 7, wherein said upper portion is generally parallel to said window and said lower portion is generally perpendicular to said window.

12. The assembly of claim 7, wherein said lower portion extends downwardly underneath said window.

* * * * *